United States Patent
Zhao et al.

(10) Patent No.: US 8,633,680 B2
(45) Date of Patent: Jan. 21, 2014

(54) DIFFERENTIAL SENSING FOR VOLTAGE CONTROL IN A POWER SUPPLY CIRCUIT

(75) Inventors: Bin Zhao, Irvine, CA (US); Jack Cornish, Foothill Ranch, CA (US); Victor Lee, Irvine, CA (US)

(73) Assignee: Fairchild Semiconductor Corporation, San Jose, CA (US)

(*) Notice: Subject to any disclaimer, the term of this patent is extended or adjusted under 35 U.S.C. 154(b) by 258 days.

(21) Appl. No.: 13/216,522

(22) Filed: Aug. 24, 2011

(65) Prior Publication Data

US 2012/0249094 A1 Oct. 4, 2012

Related U.S. Application Data

(60) Provisional application No. 61/468,224, filed on Mar. 28, 2011, provisional application No. 61/472,980, filed on Apr. 7, 2011.

(51) Int. Cl.
G05F 1/44 (2006.01)
G05F 1/56 (2006.01)

(52) U.S. Cl.
USPC ........... 323/266; 323/282; 323/284; 323/285; 323/270; 323/271

(58) Field of Classification Search
USPC .................. 323/266, 282, 284, 285, 270, 271
See application file for complete search history.

(56) References Cited

U.S. PATENT DOCUMENTS

| | | | | |
|---|---|---|---|---|
| 5,982,160 A * | 11/1999 | Walters et al. | ................ | 323/282 |
| 6,979,985 B2 * | 12/2005 | Yoshida et al. | ................ | 323/282 |
| 7,492,132 B2 * | 2/2009 | Kuroiwa et al. | ................ | 323/222 |
| 7,759,920 B2 * | 7/2010 | Abe | .............................. | 323/282 |
| 7,839,130 B2 * | 11/2010 | Shimizu | ........................ | 323/282 |
| 8,373,397 B2 * | 2/2013 | Tanifuji et al. | ................ | 323/271 |
| 2007/0035281 A1 * | 2/2007 | Kuroiwa et al. | ................ | 323/222 |
| 2012/0153723 A1 * | 6/2012 | Van Dijk | ........................ | 307/31 |

OTHER PUBLICATIONS

"2.5A Step-Down Regulator with Remote Sense in 2mm ×2mm WLP", MAX8952, Maxim Integrated Products, Revision 1, Jun. 2011, pp. 1-31.
"6-Bit VID Controlled 2-4 Phase DC-DC Controller", Fairchild Semiconductor, FAN5019, Objective Specification FAN5019, Revision 0.0.4, Aug. 5, 2003, pp. 1-28.
"PWM DC/DC Controller with VID Inputs for Portable GPU Core-Voltage Regulator", intersil, ISL95870, ISL95870A, ISL95870B, FN6899.0, Dec. 22, 2009, pp. 1-29.
"Single Phase PWM Controller with Light-Load Efficiency Optimization", ST, L6738, Revision 0.74, Mar. 17, 2009, pp. 1-27.

* cited by examiner

*Primary Examiner* — Bao Q Vu
(74) *Attorney, Agent, or Firm* — Brake Hughes Bellermann LLP

(57) ABSTRACT

In one general aspect, an apparatus can include a controller, and a power stage coupled to the controller and configured to be coupled to a power source. The power stage is configured to deliver an output voltage to a load module in response to the controller. The apparatus also includes a reference voltage circuit coupled to the controller and configured to be grounded to a first ground voltage different from a second ground voltage associated with the load module.

29 Claims, 6 Drawing Sheets

DIFFERENTIAL SENSING FOR VOLTAGE CONTROL IN A POWER SUPPLY CIRCUIT

RELATED APPLICATIONS

This application claims priority to and the benefit of U.S. Provisional Patent Application Ser. No. 61/468,224, filed on Mar. 28, 2011, entitled, "Differential Sensing for Voltage Control in a Power Supply," and claims priority to and the benefit of U.S. Provisional Patent Application Ser. No. 61/472,980, filed on Apr. 7, 2011, entitled, "Differential Sensing for Voltage Control in a Power Supply," both of which are incorporated herein by reference in their entireties.

TECHNICAL FIELD

This description relates to differential sensing for voltage control in a power supply circuit.

BACKGROUND

Some known power supply circuits (e.g., a direct current (DC)-to-DC converter such as a buck converter) can be configured to regulate an output voltage provided to a load module. Because of parasitic voltage drops associated with a printed circuit board (PCB) and/or packaging around the actual semiconductor transistor devices within the load module, the voltage provided to the load module can be different from the voltage provided to the semiconductor devices within the load module. Although various techniques (e.g., error correction feedback loops) and/or additional components can be used to correct for the parasitic voltage drops, the drawbacks, such as increased power consumption, control loop instability, etc. using these techniques and/or additional components are undesirable in some applications. Also, some of these known solutions are not capable of providing a desirable level of voltage control across the semiconductor devices included in the load module with relatively wide variations in load current. Thus, a need exists for systems, methods, and apparatus to address the shortfalls of present technology and to provide other new and innovative features.

SUMMARY

In one general aspect, an apparatus can include a power stage configured to be coupled to a power source, and a reference voltage circuit coupled to the controller and configured to be grounded to a first ground voltage different from a second ground voltage associated with the load module. The apparatus can also include a controller coupled to the power stage and coupled to the reference voltage circuit where the controller configured to trigger the power stage to deliver an output voltage to a load module based on a combination of a first feedback signal produced based on the output voltage and a second feedback signal produced based on a voltage between the output voltage and the first ground voltage.

In another general aspect, an apparatus can include a controller including a hysteretic comparator, and a power stage coupled to the controller and configured to be coupled to a power source. The power stage is configured to deliver an output voltage to a load module in response to the controller. The apparatus also includes a reference voltage circuit coupled to the controller and configured to be grounded to a first ground voltage different from a second ground voltage associated with the load module.

In another general aspect, a power supply circuit can include a power stage configured to be coupled to a load module and configured to be coupled to a first ground voltage. The apparatus can include a reference voltage circuit configured to be coupled to a second ground voltage varying (e.g., moving, floating) with respect to a first ground voltage in response to a current through the load module. The reference voltage circuit can be configured to produce a reference voltage based on the second ground voltage. The power supply circuit can also include a controller coupled to the power stage and coupled to the reference voltage circuit. The controller can be configured to trigger the power stage to deliver an output voltage to the load module based on a combination of a feedback signal from a power side of a plurality of load devices included in the load module, the reference voltage, and a ripple signal.

In yet another general aspect, a method can include receiving a first voltage from a first location internal to a package of a load module where the first voltage is different from a ground voltage for the load module. The method can include receiving a second voltage from a second location internal to the package of the load module where the second voltage is different from the ground voltage for the load module. Also, the method can include producing a reference voltage based on the first voltage, and producing an output voltage for the load module based on the reference voltage and the second voltage.

In yet another general aspect, an apparatus can include a power stage configured to be coupled to a power source. The apparatus can include a reference voltage circuit coupled to the controller and configured to be grounded to a first ground voltage different from a second ground voltage associated with the load module. The apparatus can also include a controller coupled to the power stage and coupled to the reference voltage circuit. The controller can be configured to trigger the power stage to deliver an output voltage to a load module based on a combination of a first feedback signal produced based on the output voltage and a second feedback signal produced based on a voltage between the output voltage and the first ground voltage.

The details of one or more implementations are set forth in the accompanying drawings and the description below. Other features will be apparent from the description and drawings, and from the claims.

DETAILED DESCRIPTION

Figure 1:
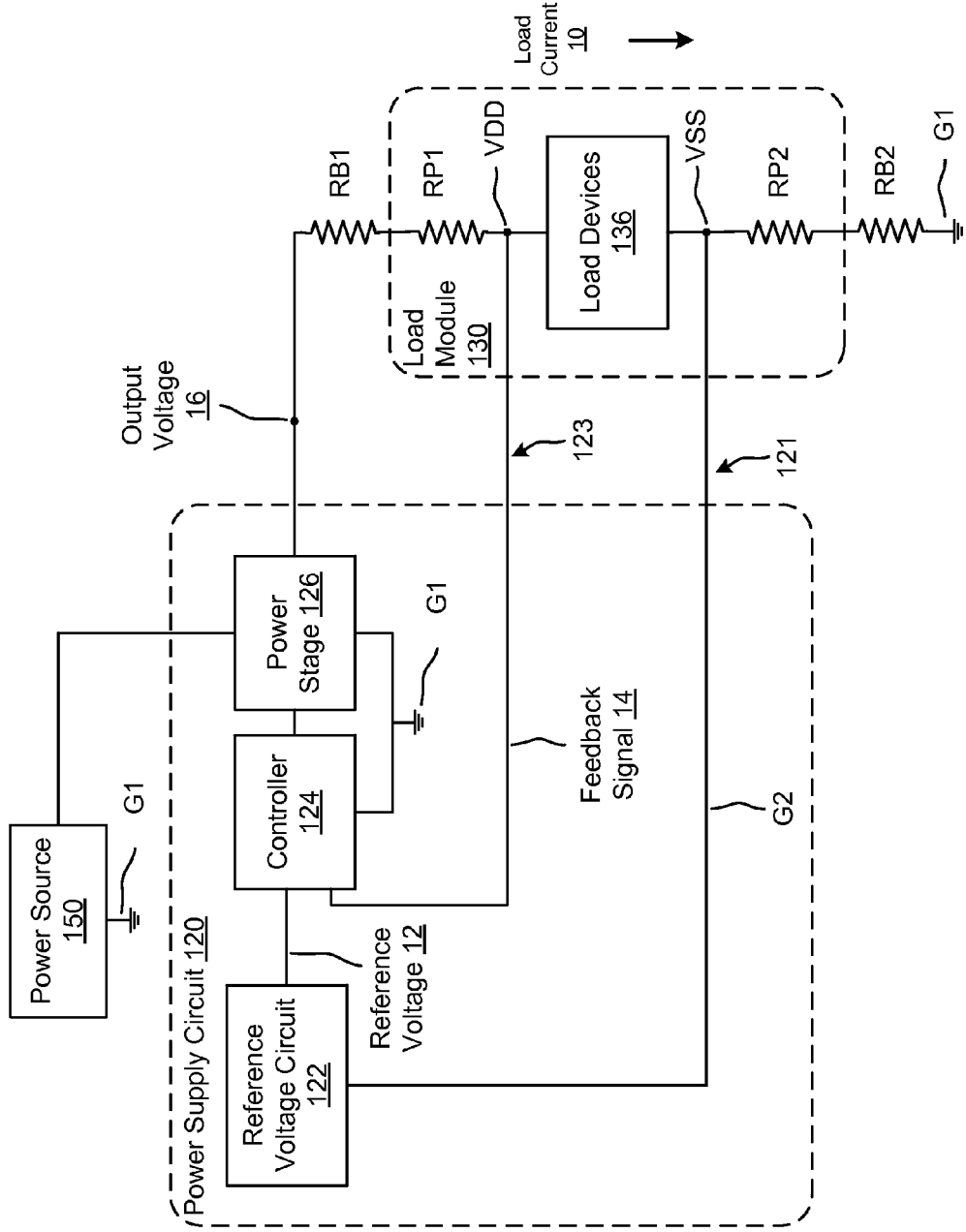
FIG. 1 is a diagram that illustrates a power supply circuit configured to deliver power from a power source to a load module.

FIG. 1 is a diagram that illustrates a power supply circuit 120 configured to deliver power from a power source 150 to a load module 130 (also can be referred to as a working device). The power supply circuit 120 includes a reference voltage circuit 122 (e.g., a bandgap reference circuit), a controller 124, and a power stage 126. The power supply circuit 120 is configured to manage (e.g., control, regulate) an output voltage 16 that is delivered to the load module 130 based on a reference voltage 12 and based on a feedback signal 14 (associated with a feedback control loop and defined by one or more feedback voltages).

Specifically, the controller 124 included in the power supply circuit 120 can be configured to trigger the power stage 126 to deliver power or interrupt power delivery from the power source 150 to the load module 130. In some embodiments, the controller 124 can include a comparator (e.g., an error comparator), and/or other circuitry. For example, the controller 124 can be configured to trigger the power stage 126 to deliver power from the power source 150 when the feedback signal 14 (e.g., a voltage defining the feedback signal) decreases a specified amount (e.g., decreases more than a threshold amount) with respect to the reference voltage 12. Similarly, the controller 124 can be configured to trigger the power stage 126 to interrupt power delivered from the power source 150 when the feedback signal 14 increases a specified amount (e.g., increases more than a threshold amount) with respect to the reference voltage 12.

As shown in FIG. 1, the reference voltage circuit 122 is configured to produce the reference voltage 12 based on a ground voltage G2. The ground voltage G2 is different from a ground voltage G1, which is the ground voltage used for at least some of the components of the power supply circuit 120, the load module 130, and the power source 150. In some embodiments, because the ground voltage G2 functions as a ground voltage for the reference voltage circuit 122, the ground voltage G2 can be referred to as a reference ground voltage (or as a sense ground or local ground voltage). In some embodiments, the ground voltage G1 can be referred to as a global ground voltage.

As shown in FIG. 1, the reference ground voltage G2 is from a location (e.g., a node) internal to load module 130 and in close proximity to load devices 136 rather than coupled to the global ground voltage G1. The load devices 136 can include many different types of devices such as semiconductor devices including transistors, resistors, inductors, capacitors, and/or so forth. Because the reference voltage 12 is produced by the reference voltage circuit 122 based on the reference ground voltage G2, which is in close proximity to load devices 136, the power supply circuit 120 can manage power delivered to load devices 136 within the load module 130 more accurately than if the reference voltage 12 is produced by the reference voltage circuit 122 based on the global ground voltage G1 (which is not as close to the load devices 136).

Specifically, the reference ground voltage G2 is from a location (e.g., a node) in close proximity to the load devices 136 and unaffected by (e.g., substantially unaffected by) parasitic resistances associated with packaging (e.g., traces, wirebonds, connectors, etc.) of the load module 130, which are represented by parasitic packaging resistor RP2, and/or board resistances (e.g., printed circuit board traces), which are represented by parasitic board resistor RB2. Accordingly, the reference ground voltage G2 is from a location disposed between the load devices 136 and parasitic packaging resistor RP2. In this embodiment, the location at which the reference ground voltage G2 is coupled can be referred to as internal ground VSS (or as load device ground VSS), and can be from a ground side of the load devices 136 (or load module 130).

Similarly, as shown in FIG. 1, the feedback signal 14 is from a location internal to the load module 130 (rather than being coupled to, or in close proximity to, the output voltage 16). Because the feedback signal 14 is in close proximity to load devices 136, the power supply circuit 120 can manage power delivered to the load devices 136 within the load module 130 more accurately than if the feedback signal 14 is based on the output voltage 16 (which is not as close to the load devices 136). Specifically, the feedback signal 14 is from a location in close proximity to the load devices 136 and unaffected by (e.g., substantially unaffected by) parasitic resistances associated with packaging (e.g., traces, wirebonds, connectors, etc.) of the load module 130, which are represented by parasitic packaging resistor RP1, and/or board resistances (e.g., printed circuit board traces), which are represented by parasitic board resistor RB1. Accordingly, the feedback signal 14 is from a location disposed between the load devices 136 and parasitic packaging resistor RP1. In this embodiment, the location at which the feedback signal 14 is coupled can be referred to as internal supply voltage VDD (or as load device supply voltage VDD), and can be on a power supply side of the load devices 136 (or load module 130).

A load current 10 drawn through (e.g., consumed by) the load module 130 during operation of the load module 130 can vary based on processing by the load module 130. For example, when the load module 130 is engaged in intense signal processing (e.g., data processing, providing an output), the load current 10 can be higher than when the load module 130 is idle (e.g., in a standby mode, not providing an output). Accordingly, the voltage drops (which can be referred to as parasitic voltage drops) across the parasitic packaging resistors RP1, RP2 (which can be less than an ohm), and across the parasitic board resistors RB1, RB2 (which can be less than an ohm) can vary based on processing performed by the load module 130. The power supply circuit 120 shown in FIG. 1 is configured to manage the voltage across load devices 136 based on a feedback signal 14 coupled to the internal supply voltage VDD and a reference voltage 12 produced based on the reference ground voltage G2, which is coupled to the internal ground VSS, so that the voltage cross the load devices 136 can be managed without (or substantially without) influence from the parasitic voltage drops. Specifically, the reference voltage 12, which is produced by the reference voltage circuit 122 and is used for management of the voltage drop across the load devices 136 by the power supply circuit 120, will change (e.g., vary, move, increase, decrease) with changes (e.g., increases, decreases) in the reference ground voltage G2. Although not shown in FIG. 1, the power supply circuit 120 may not be capable of managing the voltage across the load devices 136 in a desirable fashion if the power supply circuit 120 were configured to manage the voltage across the load devices 136 based on, for example, the output voltage 16 (which is outside of the package of the load module 130) and a reference voltage 12 produced based on the global ground voltage G1 (which is outside of the package of the load module 130 and does not vary (e.g., move)) because of the parasitic voltage drops.

As an example, the power supply circuit 120 can be configured to maintain a voltage across the load devices 136 (from the internal supply voltage VDD to the internal ground voltage VSS) of load module 130 at a voltage of approximately 1.5 volts (V) based on the feedback signal 14 and the reference voltage 12 using the configuration shown in FIG. 1. The voltage across the load devices 136 can thus be maintained (e.g., biased) at 1.5 V based on the internal supply voltage VDD and the internal ground voltage VSS. When the load devices 136 of load module 130 are actively processing data, the load devices 136 may be draw as much as, for example, 3 amps (A) of current. In this instance, even if the total resistance of the parasitic resistors RP1, RP2 and the parasitic board resistors RB1, RB2 is as small as approximately 50 milliohms (mΩ) the combined voltage drop across these parasitic resistors would be approximately 150 mV. Because the power supply circuit 120 shown in FIG. 1 is configured to maintain the voltage across the load devices 136 based on the internal supply voltage VDD (via the feedback signal 14) and the internal ground voltage VSS (via the reference ground G2) the voltage increase of 150 mV caused by the parasitic resistors does not affect (e.g., does not substantially affect) the voltage control provided by the power supply circuit 120.

If the power supply circuit 120 were instead configured to maintain the output voltage 16 at 1.5V (which is different than the configuration shown in FIG. 1) based on a feedback signal (not shown) associated with the output voltage 16 and/or a reference voltage 12 based on the global ground voltage G1, the power supply circuit 120 cannot accurately maintain the voltage across the load devices 136 at 1.5V when the load devices 136 are engaged in intensive data/signal processing. For example, when the load devices 136 are drawing a current of approximately 3 A during intensive data/signal processing, the total voltage drop across the parasitic resistors RP1, RP2 and the parasitic board resistors RB1, RB2 (if the total resistance is assumed to be approximately 50 mΩ) would be approximately 150 mV. Although the output voltage 16 could be maintained by the power supply circuit 120 at 1.5 V, the voltage drop across load devices 136 (from the internal supply voltage VDD to the internal ground voltage VSS) would be 1.35 V (1.5 V minus 150 mV).

In some embodiments, the feedback signal 14 and/or the reference ground voltage G2 can be from sense voltage outputs integrated into the load module 130. For example, if load module 130 is a microprocessor (or other type of circuit), a microprocessor can have sense voltage outputs built into the microprocessor that can be used for the feedback signal 14 and/or the reference ground voltage G2. In some embodiments, internal supply voltage VDD and/or the internal ground voltage VSS can by physically close to sources, drains, cathodes, anodes, etc. of transistor devices included in the load devices 136 of the load module 130. In some embodiments, the feedback signal 14 and/or the reference ground voltage G2 can be from locations coupled to (or near) the critical devices (e.g., components) across which voltage should be (or are targeted to be) regulated by the power supply circuit 120.

In some embodiments, the internal supply voltage VDD (which is equal to, or approximately equal to, the feedback signal 14) and the internal ground voltage VSS (which is equal to, or approximately equal to, the reference ground voltage G2) can define a set of rail voltages that are different than a set of rail voltages defined by the output voltage 16 and the global ground voltage G1. In some embodiments, the set of rail voltages defined by the internal supply voltage VDD and the internal ground voltage VSS can be referred to as rail voltages associated with load devices 136 (or as internal rail voltage), and the set of rail voltages defined by the output voltage 16 and the global ground voltage G1 can be referred to as rail voltages associated with the load module 130 (or as external rail voltage). In some embodiments, the rail voltages associated with load devices 136 can be within the rail voltages associated with load module 130 (which includes parasitic resistances). In other words, the internal supply voltage VDD can be lower than output voltage 16, and the internal ground voltage VSS can be higher than the global ground voltage G1. In some embodiments, when the load current 10 is relatively small, the output voltage 16 can be approximately equal to the internal supply voltage VDD, and global ground voltage G1 can be approximately equal to the internal ground voltage VSS. The difference between the rail voltages associated with load devices 136 and the rail voltages associated with load module 130 can increase with increasing load current 10 and decrease with decreasing load current 10.

Moreover, because the reference ground voltage G2 is coupled to a different location in the load module 130 than the global ground voltage G1, reference ground voltage G2 can be different than the global ground voltage G1. In some embodiments, the reference ground voltage G2 can have a voltage that is higher than a voltage of the global ground voltage G1. In some embodiments, the reference ground voltage G2 can vary with respect to the global ground voltage G1 depending on the load current 10. For example, a relatively high load current 10 can cause relatively high voltage drops across parasitic package resistor RP2 and parasitic board resistor RB2, leading to a corresponding difference between the reference ground voltage G2 and the global ground voltage G1.

Although not shown in FIG. 1, the reference ground voltage G2 can be different from the internal ground voltage VSS by a voltage drop(s) across a parasitic packaging resistance and/or a parasitic board resistance (and/or other parasitic resistances) along path 121. In other words, a parasitic packaging resistance and/or a parasitic board resistance can be disposed between the reference voltage circuit 122 and the internal ground voltage VSS along path 121. In some embodiments, voltage drops associated with parasitic packaging resistance and/or parasitic board resistance along path 121 are negligible because a current along path 121 from the reference voltage circuit 122 is relatively small. For example, in some embodiments, currents along path 121 is less than one milliamps (mA) (e.g., less than 0.5 mA, less than 100 µA). In some embodiments, the parasitic resistance along path 121 is on the order of or less than 1 Ohm, leading to voltage drop on the order of 1 mV or less. Thus, in some embodiments, voltage control inaccuracy caused by parasitic resistance along path 121 is negligible.

In some embodiments, the reference voltage circuit 122 and/or the controller 124 can be calibrated (e.g., adjusted) based on anticipated voltage drops across parasitic resistors along path 121. For example, a constant offset can be built into the reference voltage to cancel the constant error introduced by relatively large voltage drop across parasitic resistors along path 121 since both the parasitic resistance and the reference current consumption along path 121 can be constant, in some embodiments. In some embodiments, the parasitic resistance value can be tailored at the board level such that the voltage drop along path 121 can be cancelled precisely by the build-in offset in the reference voltage for precise voltage control at the load devices 136.

In some embodiments, the current along path 121 and/or path 123 will be within a much smaller range of currents than the load current 10 through the load devices 136. For example, the current along path 121 and/or path 123 may vary between zero amps and a few milliamps, whereas the load current 10 may vary between zero amps, a few milliamps (when in a standby mode), and several amps (e.g., several amps during intensive signal processing). Accordingly, even if a parasitic packaging resistance along path 121 and/or path 123 is as large as (or even greater than) the parasitic packaging resistor RP1 and/or RP2 and/or the parasitic board resistors RB1 and/or RB2, the voltage drop across the parasitic packaging resistance along path 121 and/or path 123 will generally be significantly smaller than a voltage drop associated with the parasitic packaging resistor RP1 and/or RP2 and/or the parasitic board resistors RB1 and/or RB2 (because of the significant differences in their respective currents).

Similarly, although not shown in FIG. 1, the feedback signal 14 can be different from the internal supply voltage VDD by a voltage drop(s) across a parasitic packaging resistance and/or a parasitic board resistance (and/or other parasitic resistances) along path 123. In other words, a parasitic packaging resistance and/or a parasitic board resistance can be disposed between the controller 124 and the internal supply voltage VDD along path 123. In some embodiments, voltage drops associated with parasitic packaging resistance and/or parasitic board resistance along path 123 are negligible because a current along path 123 to the controller 124 is quite (e.g., is relatively) small. In some embodiments, the reference voltage circuit 122 and/or the controller 124 can be calibrated (e.g., adjusted) based on anticipated voltage drops related to parasitic resistances along path 123.

In some embodiments, calibration for parasitic resistances (e.g., parasitic board resistances, parasitic packaging resistances) along path 121 and/or along path 123 can be performed (e.g., dynamically performed) based on the power mode of the power supply circuit 120, e.g., pulse width modulation (PWM) mode, pulse frequency modulation (PFM) mode of a buck regulator. In some embodiments, parasitic resistances along path 121 and/or along path 123 can be defined to obtain a desired result within the power supply circuit 120. For example, a parasitic board resistance along path 121 can be configured to balance (at the reference voltage circuit 122 and/or at the controller 124) a parasitic board resistance along path 123 to obtain a precise voltage control at the load device 136.

Using the feedback signal 14 and the reference ground voltage G2, which are each coupled internal to the load module 130 (in the differential sense scheme shown in FIG. 1), voltage errors from the power supply side and a ground side of the load module 130 can be avoided (e.g., substantially avoided). The voltage errors can be caused by relatively large load current 10 through the load module 130 and non-negligible parasitic resistance in the power and ground paths of the load module 130. The configuration shown in FIG. 1 does not require a complicated error amplifier that can potentially lead to control loop instability, additional cost and complexity, etc.

Although not shown in FIG. 1, in some embodiments, the reference ground voltage G2 can be produced by a ground voltage circuit (along path 121) based on the internal ground voltage VSS. In some embodiments, the ground voltage circuit can be, for example, a voltage divider or other type of circuit. In such embodiments, the reference ground voltage G2 may not be equal to (or substantially equal to) the internal ground voltage VSS. Similarly, although not shown in FIG. 1, in some embodiments, the feedback signal 14 can be produced by a feedback circuit (e.g., a voltage divider along path 123) based on the internal supply voltage VDD.

In some embodiments, the power supply circuit 120 can be, or can include, for example, any type of switch regulator that includes a switch circuit within the power stage 126. In some embodiments, power supply circuit 120 can be referred to as a switched-mode power supply (SMPS). For example, power supply circuit 120 can be, or can include, a buck regulator, a boost regulator, a buck boost regulator, and/or so forth. In some embodiments, the power supply circuit 120 can be, or can include, any combination of DC-to-DC (e.g., a buck-boost converter) or alternating current (AC)-to-DC converters.

Although not shown, an input stage, an output stage (e.g., an output stage including inductors and/or capacitors), and/or so forth, may be operably coupled to, or included in the power stage 126 and/or the controller 124 shown in FIG. 1. An output stage can include any circuitry that can be used in a specific implementation of the power stage 126. For example, the output stage can include various types of circuitry for the power stage 126 including, for example, one or more capacitors, inductors, transformers, transistors, resistors, feedback circuits, and/or so forth.

Although not shown, in some embodiments, the controller 124 can include one or more comparators, amplifiers, an input stage, any type of control circuitry configured to produce a control signal that can trigger switching of a switch circuit within the power stage 126, and/or so forth. For example, the control circuit of the power stage 126 can include a signal generator configured to produce a control signal that has a square-wave waveform (e.g., a square-wave waveform with rising and falling edges).

In some embodiments, the power source 150 can be any kind of power source. For example, the power source 150 can be a direct current (DC) power source such as a battery, a fuel cell, and/or so forth. Although not shown in FIG. 1, additional portions of the power supply circuit 120 (in addition to the power stage 126) may be powered by the power source 150. For example, the reference voltage circuit 122, controller 124, and/or so forth, may be coupled to and/or powered by the power source 150.

Figure 2A:
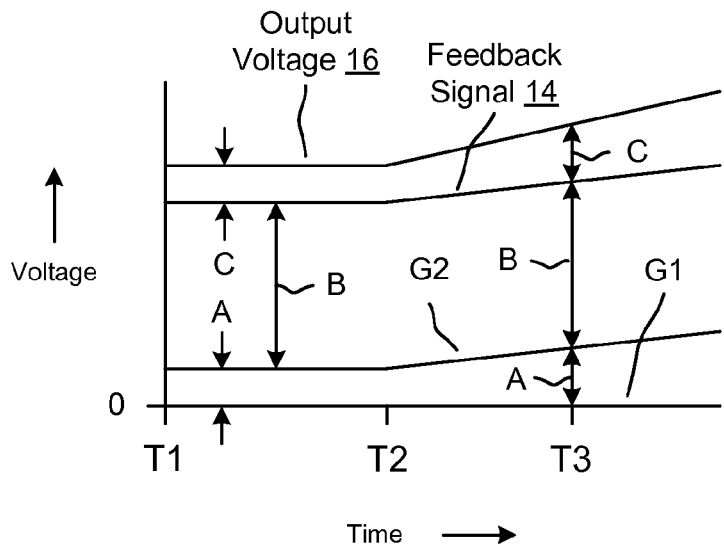
FIG. 2A is a graph that illustrates voltages within the power supply circuit shown in FIG. 1.
Figure 2B:
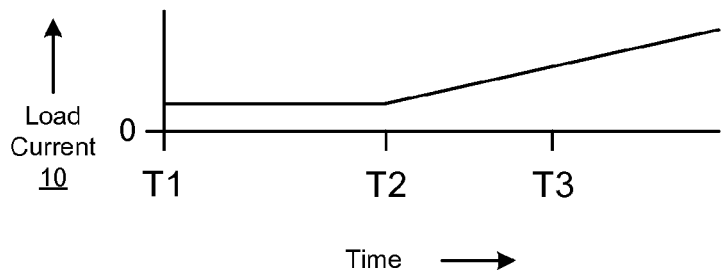
FIG. 2B is a graph that illustrates a load current through the load module shown in FIG. 1.
Figure 2C:
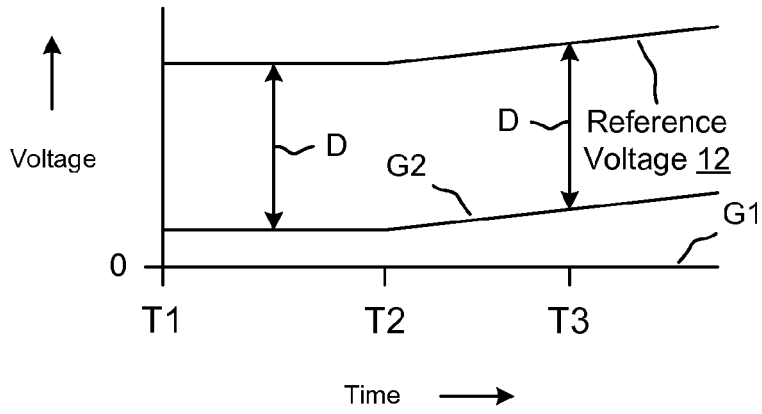
FIG. 2C is a graph that illustrates a reference voltage relative to the global ground voltage and the reference ground voltage shown in FIG. 1.

FIGS. 2A through 2C are graphs that collectively illustrate operation of at least some portions of the power supply circuit 120 shown in FIG. 1, according to an embodiment. As shown in FIGS. 2A through 2C, time is increasing to the right.

Although the behavior of portions of the power supply circuit 120 are described, in connection with FIGS. 2A through 2C, as making transitions at specified times, voltages, and so forth, when implemented (e.g., implemented using metal-oxide-semiconductor field effect transistor (MOSFET) devices), the transitions of the components may occur slightly before or slightly after the specified voltages and/or specified times. Specifically, variations in threshold voltages, processing variations, temperature variations, switching times of devices, circuit transition delays, and/or so forth can result in conditions (e.g., non-ideal conditions) that can trigger transitions of components of the power supply circuit 120 slightly before or slightly after the specified voltages and/or times. Also, some relatively minor non-idealities such as noise (e.g., switching noise), drift, and/or so forth, are not depicted in these graphs.

FIG. 2A is a graph that illustrates voltages within the power supply circuit 120 shown in FIG. 1. As shown in FIG. 2A, voltage is on the y-axis, and the depicted voltages are shown referenced to the global ground voltage G1 of the power supply circuit 120 (shown as 0 V). FIG. 2B is a graph that illustrates the load current 10 through the load module 130 shown in FIG. 1. FIG. 2C is a graph that illustrates the reference voltage 12 relative to the global ground voltage G1 and the reference ground voltage G2 shown in FIG. 1.

As shown in FIG. 2B, the load current 10 is a relatively constant and low value between times T1 and T2. In some embodiments, the load current 10 can be a relatively constant and low value because the load module 130 is in a standby state where current drawn through the load module 130 is relatively low and constant. As shown in FIG. 2B, load current 10 increases starting at time T2 and beyond time T3. The load current 10 through load module 130 can increase as signal/data processing performed by the load module 130 increases. In some embodiments, the load current 10 through load module 130 may not increase gradually as shown in FIG. 2B, but may increase abruptly in a stepwise fashion. The time period between times T1 and T2 will be referred to as the standby time period, and the time period starting at time T2 will be referred to as the signal/data processing time period.

As shown in FIG. 2A, the reference ground voltage G2 is relatively constant with respect to the global ground voltage G1 during the standby time period. In some embodiments, the difference between the reference ground voltage G2 and the global ground voltage G1 can be associated with a voltage drop across the parasitic packaging resister RP2 and the parasitic board resister RB2, which is represented in FIG. 2A as voltage drop A. The difference between the voltage feedback 14 and the output voltage 16 represents a voltage drop C across the parasitic packaging resister RP1 and the parasitic board resister RB1.

The difference between the reference ground voltage G2 and the feedback signal 14 is a voltage drop B across the load devices 136 included in the load module 130. In this embodiment, the feedback signal 14 represents the upper voltage (or the internal supply voltage VDD) of the load devices 136, and the reference ground voltage G2 represents the lower voltage (or the internal ground voltage VSS) of the load devices 136. In this embodiment, the power supply circuit 120 is configured to maintain the voltage drop across the load devices 136 at the voltage drop B.

As the load current 10 through the load device 130 increases as shown in FIG. 2B, the voltage drop A and the voltage drop C increase as shown in FIG. 2A. For example, the voltage drop A at time T3 is greater than the voltage drop A during the standby time period, and the voltage drop C at time T3 is greater than the voltage drop C during the standby time period.

The voltage drop B across the load devices 136, however, is maintained by the power supply circuit 120 even though the load current 10 through load device 130 increases starting at time T2. For example, the voltage drop B at time T3 is equal to (or approximately equal to) the voltage drop B during the standby time period.

As shown in FIG. 2A, the reference ground voltage G2 increases with respect to the global ground voltage G1 with the increasing load current 10. Also, although the voltage drop B is constant (or approximately constant) despite increasing load current 10, the voltage range defining the voltage drop B increases (e.g., rises) with respect to the global ground voltage G1. In other words, the voltage drop B shown in FIG. 2A is, however, shifted upward relative to the global ground voltage G1 with the increase in load current 10 shown in FIG. 2B.

The voltage drop B can be maintained by the power supply circuit 120 (as shown in FIG. 2A) despite the increasing load current 10 (as shown in FIG. 2B) because the reference voltage 12 shown in FIG. 2C increases (e.g., varies upward) with respect to the global ground voltage G1 as a load current 10 increases. As shown in FIG. 2C, the difference between the reference ground voltage G2 and the reference voltage 12, which is produced by the voltage reference circuit 122 based on the reference ground voltage G2, is represented by voltage drop D. The voltage drop D is constant (or approximately constant) despite the increasing load current 10. For example, the voltage drop D at time T3 is equal to (or approximately equal to) the voltage drop D during the standby time period.

Because the reference voltage 12 produced by the voltage reference circuit 122 increases (e.g., varies upward) with the increasing reference ground voltage G2 (as shown in FIG. 2C), the voltage drop B can be maintained at a constant value (or approximately constant value) by the power supply circuit 120. If the reference voltage 12 were instead produced based on the ground voltage G1, which remains constant even after the load current 10 starts increasing at time T2, the reference voltage 12 would be a relatively constant value (and would not vary with the increasing load current 10 shown in FIG. 2C). Accordingly, the feedback signal 14, which represents the upper voltage across load devices 136 of the load module 130 would remain relatively constant with respect to the ground supply voltage G1, and the voltage drop B across the load devices 136 would decrease in an undesirable fashion with the increasing load current 10.

Although FIGS. 2A through 2C are related to an increase of the load current 10, the power supply circuit 120 can also similarly operate with a decrease in load current 10. In such embodiments, the reference ground voltage G2 and the reference voltage 12 produced by reference voltage circuit 122 will decrease (e.g., vary downward) with the decrease in the load current 10. Accordingly, the voltage drop B (which is approximately the voltage across the load devices 136) can be maintained despite the decrease in load current 10.

Figure 3:
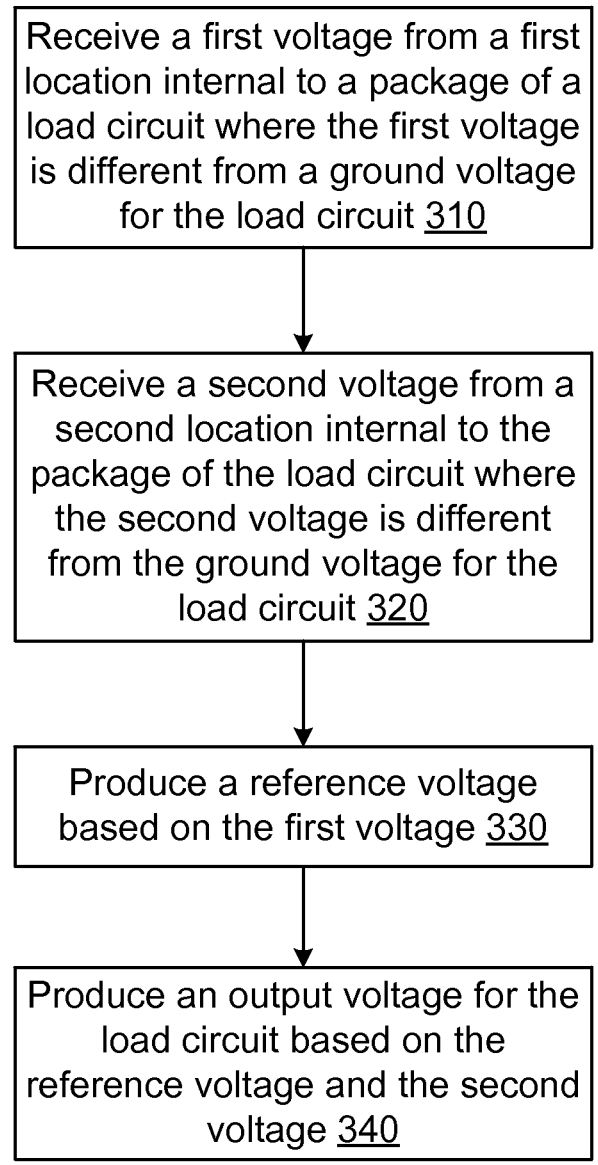
FIG. 3 is a flowchart that illustrates operation of a power supply circuit, according to an embodiment.

FIG. 3 is a flowchart that illustrates operation of a power supply circuit, according to an embodiment. In some embodiments, the power supply circuit can be similar to, or the same as, the power supply circuit 120 shown in FIG. 1.

As shown in FIG. 3, a first voltage is received from a first location internal to a package of a load module where the first voltage is different from a ground voltage for the load module (block 310). In some embodiments, the first voltage can be the reference ground voltage G2 shown in FIG. 1. In some embodiments, the first voltage can be approximately equal to an internal ground voltage (e.g., internal ground voltage VSS shown in FIG. 1) of the load module.

A second voltage is received from a second location internal to the package of the load module, the second voltage being different from the ground voltage for the load module (block 320). In some embodiments, the second voltage can be the feedback signal 14 shown in FIG. 1. In some embodiments, the second voltage can be approximately equal to an internal supply voltage (e.g., internal supply voltage VDD shown in FIG. 1) of the load module. In some embodiments, the ground voltage can be lower than the first voltage and the second voltage.

A reference voltage is produced based on the first voltage (block 330). The reference voltage can be produced by a reference voltage circuit (e.g., reference voltage circuit 122 shown in FIG. 1). In some embodiments, the reference voltage circuit can be, for example, a bandgap reference circuit. In some embodiments, the reference voltage can be configured to change (e.g., vary, increase and decrease) with changes (e.g., an increase or decrease) of the first voltage.

An output voltage for the load module is produced based on the reference voltage and the second voltage (block 340). In some embodiments, the output voltage to load module can be produced at least in part by a controller (e.g., controller 124 shown in FIG. 1) and a power stage (e.g., power stage 126 shown in FIG. 1). In some embodiments, the output voltage 16 can be higher than the first voltage and the second voltage.

Figure 4:
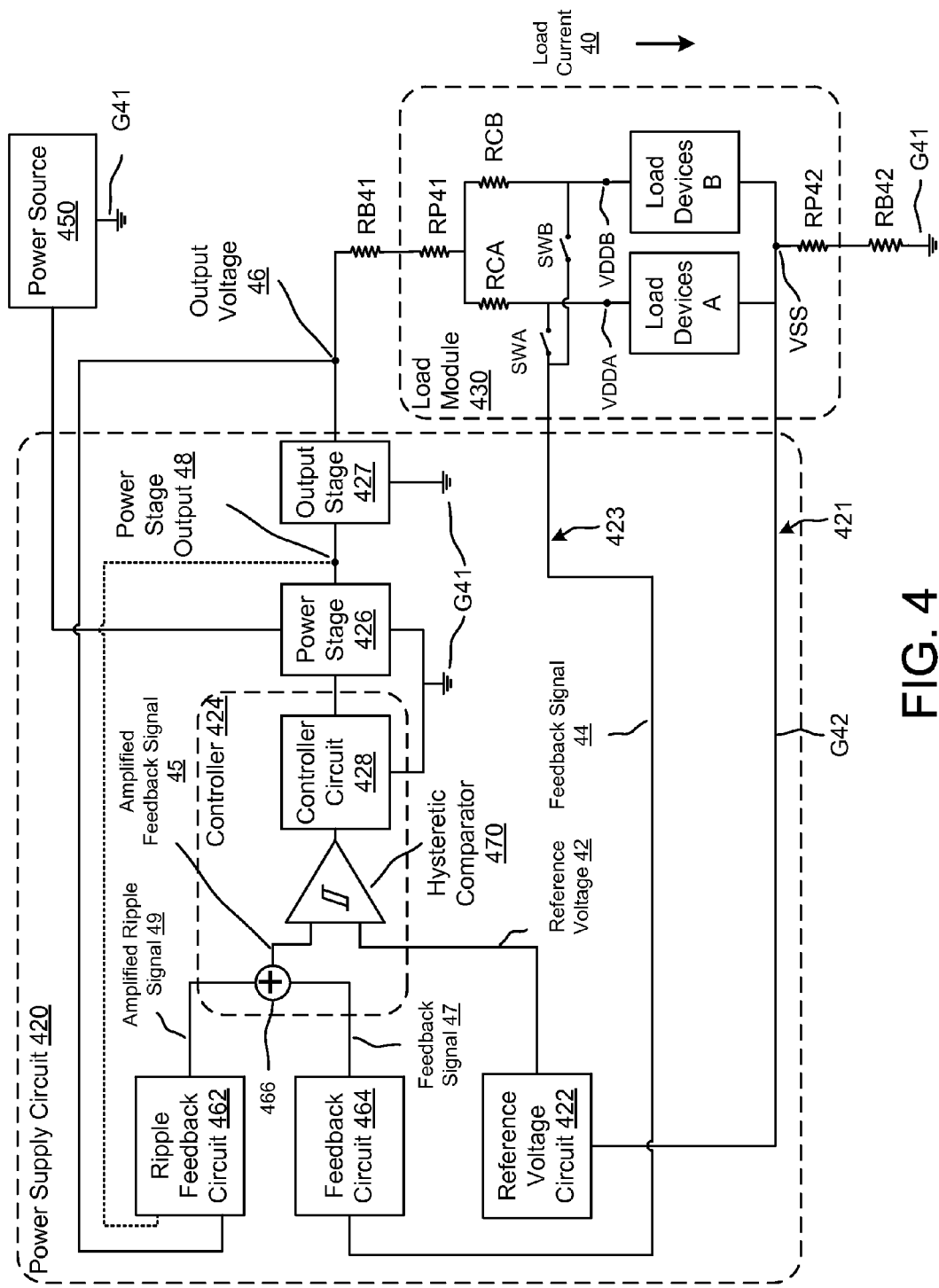
FIG. 4 is a diagram that illustrates another power supply circuit configured to deliver power from a power source to a load module.

FIG. 4 is a diagram that illustrates another power supply circuit 420 configured to deliver power from a power source 450 to a load module 430 (also can be referred to as a working device). The power supply circuit 420 includes a reference voltage circuit 422 (e.g., a bandgap reference circuit), a controller 424, a power stage 426, and an output stage 427. The power supply circuit 420 is configured to manage (e.g., control, regulate) an output voltage 46 that is delivered to (e.g., provided to) the load module 430 based on a reference voltage 42, a feedback signal 47, and an amplified ripple signal 49. As shown in FIG. 4, the feedback signal 47 and the amplified ripple signal 49 are combined (e.g., summed at an adder component 466) to produce an amplified feedback signal 45.

In some embodiments, the amplified ripple signal 49 can be a first feedback signal and the feedback signal 47 can be a second feedback signal. In such embodiments, the amplified feedback signal 45 can be a third feedback signal produced based on (e.g., based on a combination of) the first feedback signal and the second feedback signal. In some embodiments, the signals can each be defined by one or more voltages that can change over time. In some embodiments, the amplified ripple signal 49 (or component signals used to the produce the amplified ripple signal 49) can function as, or can be referred to as, an alternating current (AC) feedback signal, and the feedback signal 47 (or component signals used to the produce the feedback signal 47) can functions as, or can be referred to as, a direct current (DC) feedback signal. As shown in FIG. 4, the AC feedback signal(s) and the DC feedback signal(s) are associated with different locations of the load module 430.

The power supply circuit 420 shown in FIG. 4 is a hysteretic-type power supply circuit (e.g., a hysteretic power converter, a hysteretic direct-current (DC)-to-DC buck converter, a hysteretic DC-to-DC buck-boost converter) configured to provide hysteretic voltage control for the load module 430 (e.g., the load devices A, B of the load module 430). Specifically, as a hysteretic-type power supply circuit, the power supply circuit 420 is configured to control, with a relatively fast response, the output voltage 46 within an output voltage range bounded by an upper threshold voltage and a lower threshold voltage. When the output voltage 46 falls below (or equals) the lower threshold voltage, the power supply circuit 420 is configured to provide power to load module 430. When the output voltage 46 exceeds (or equals) the upper threshold voltage, the power supply circuit 420 is configured to interrupt (e.g., decrease, turn-off) power to load module 430. Accordingly, the output voltage 46 can be maintained by the power supply circuit 420 between (or approximately between) the upper threshold voltage and lower threshold voltage of the output voltage range. In some embodiments, the upper threshold voltage and the lower threshold voltage can collectively be referred to as output threshold voltages or as voltage limits of the output voltage range.

The hysteretic control of the power supply circuit 420 is triggered, at least in part, by a hysteretic comparator 470 (and associated controller circuitry 428) included in the controller 424 of the power supply circuit 420. Specifically, the hysteretic comparator 470 (and controller circuitry 428) is configured to trigger the power stage 426 to provide power (in a hysteretic fashion) from the power source 450 based on the amplified feedback signal 45 and the reference voltage 42. The hysteretic comparator 470 is configured to use the amplified feedback signal 45, with reference to the reference voltage 42, to trigger the power stage 426 to provide (e.g., deliver) power within the output voltage range (e.g., within the voltage limits of the output voltage range). The hysteretic comparator 470 is referred to as a hysteretic comparator because it is an error comparator that has hysteresis (e.g., a 30 millivolt hysteresis (mV), a 100 mV hysteresis). In some embodiments, the hysteretic comparator 470 can be configured with a relatively fast transient response time, low power consumption, relatively small footprint (e.g., small silicon area), high gain, etc. (e.g., relative to a folded-cascode comparator).

In some embodiments, the output voltage range within which the power supply circuit 420 is managed can correspond with a hysteretic voltage range of the hysteretic comparator 470. For example, the hysteretic comparator 470 can have a hysteretic voltage range (with an upper threshold voltage and a lower threshold voltage) that is the same as or is proportional to a target output voltage range of the power supply circuit 420. In some embodiments, the hysteretic comparator 470 can be configured with a hysteretic voltage range that triggers control of the output voltage 46 of the power supply circuit 420 within a specified output voltage range. Thus, the output voltage 46 of the power supply circuit 420 can be maintained between an upper threshold voltage and a lower threshold voltage of an output voltage range based on an upper threshold voltage and a lower threshold voltage of a hysteretic voltage range of the hysteretic comparator 470. In some embodiments, the upper threshold voltage and the lower threshold voltage of the hysteretic voltage range can collectively be referred to as hysteretic threshold voltages or as voltage limits of the hysteretic voltage range.

The power supply circuit 420 shown in FIG. 4 is a variation of the power supply circuit 120 shown in FIG. 1. Similar to the power supply circuit 120 shown in FIG. 1, the power supply circuit 420 is configured to manage the output voltage 46 so that the voltages across load devices (e.g., load devices A, B) included in the load module 430 can be regulated in a desirable fashion. Specifically, as shown in FIG. 4, the reference voltage circuit 422 is configured to produce the reference voltage 42 based on a ground voltage G42. In some embodiments, the ground voltage G42 can be directly received by the reference voltage circuit 422 without intervening circuitry (e.g., operational amplifiers, sense circuitry, etc.) and/or processing. The ground voltage G42 is different from a ground voltage G41, which is the ground voltage used for at least some of the components of the power supply circuit 420, the load module 430 and/or the power source 450. In some embodiments, because the ground voltage G42 functions as a ground voltage for the reference voltage circuit 422, the ground voltage G42 can be referred to as a reference ground voltage (or as a sense ground voltage or local ground voltage). In some embodiments, the ground voltage G41 can be referred to as a global ground voltage.

As shown in FIG. 4, the reference ground voltage G42 is from a location (e.g., a node) internal to load module 430 and in close proximity to load devices A, B rather than coupled to the global ground voltage G41. The load devices A, B can include many different types of devices such as semiconductor devices including transistors, resistors, inductors, capacitors, and/or so forth. Because the reference voltage 42 is produced by the reference voltage circuit 422 based on the reference ground voltage G42, which is in close proximity to load devices A, B, the power supply circuit 420 can manage power (e.g., regulate a voltage) delivered to load devices A, B within the load module 430 more accurately than if the reference voltage 42 is produced by the reference voltage circuit 422 based on the global ground voltage G41 (which is not as close to the load devices A, B).

Specifically, the reference ground voltage G42 is from a location (e.g., a node) in close proximity to the load devices A, B and unaffected by (e.g., substantially unaffected by) parasitic resistances associated with packaging (e.g., traces, wirebonds, connectors, etc.) of the load module 430, which are represented by parasitic packaging resistor RP42, and/or board resistances (e.g., printed circuit board traces), which are represented by parasitic board resistor RB42. Accordingly, the reference ground voltage G42 is from a location disposed between the load devices A, B and parasitic packaging resistor RP42. In this embodiment, the location at which the reference ground voltage G42 is coupled can be referred to as internal ground VSS (or as load device ground VSS), and can be from a ground side of the load devices A, B (or load module 430).

Similarly, as shown in FIG. 4, the feedback signal 44 (which is used to produce feedback signal 47) is from a location internal to the load module 430 (rather than being coupled to, or in close proximity to, the output voltage 46). Because the feedback signal 44 is in close proximity to load devices A, B, the power supply circuit 420 can manage power delivered to the load devices A, B within the load module 430 more accurately than if the feedback signal 44 is based on the output voltage 46 (which is not as close to the load devices A, B). Specifically, the feedback signal 44 is from a location in close proximity to the load devices A, B and unaffected by (e.g., substantially unaffected by) parasitic resistances associated with packaging (e.g., traces, wirebonds, connectors, etc.) of the load module 430, which are represented by parasitic packaging resistor RP41, board resistances (e.g., printed circuit board traces), which are represented by parasitic board resistor RB41, and/or on-chip routing (e.g., metal routing wires), which are represented by parasitic on-chip routing resistors RCA and RCB. Accordingly, the feedback signal 44 is from a location disposed between the respective load devices A, B and the parasitic chip resistors RCA, RCB.

As shown in FIG. 4, the feedback signal 44 can be associated with load devices A or load devices B. Specifically, when switch SWA is closed (and SWB is open), the feedback signal 44 will be disposed between parasitic on-chip routing resistor RCA and load devices A. In some embodiments, the switch devices SWA, SWB can be, for example, MOSFET devices. The location at which the feedback signal 44 is coupled, when switch SWA is closed (and SWB is open), can be referred to as internal supply voltage VDDA (or as load device supply voltage VDDA), and can be on a power supply side of the load devices A of the load module 430. When switch SWB is closed (and SWA is open), the feedback signal 44 will be disposed between parasitic on-chip routing resistor RCB and load devices B. The location at which the feedback signal 44 is coupled, when switch SWB is closed (and SWA is open), can be referred to as internal supply voltage VDDB (or as load device supply voltage VDDB), and can be on a power supply side of the load devices B of the load module 430.

The switches SWA, SWB can be included in the load module 430 to selectively (e.g., optionally) allow for voltage control across load devices A and/or load devices B. In some embodiments, the switches SWA, SWB can be switched in a mutually exclusive fashion so that voltage regulation is provided by the power supply circuit 420 per need or requirement for load device A or load device B.

As similarly described in connection with FIG. 1, a load current 40 drawn through (e.g., consumed by) the load module 430 during operation of the load module 430 can vary based on signal or data processing by the load module 430 shown in FIG. 4. For example, when the load module 430 is engaged in intense signal processing (e.g., data processing, providing an output), the load current 40 can be higher than when the load module 430 is idle (e.g., in a standby mode, not providing an output). Accordingly, the voltage drops (which can be referred to as parasitic voltage drops) across the parasitic packaging resistors RP41, RP42 (which can be less than an ohm), across the parasitic board resistors RB41, RB42 (which can be less than an ohm), and/or across the parasitic on-chip routing resistors RCA, RCB can vary based on signal/data processing performed by the load module 430. The power supply circuit 420 shown in FIG. 4 is configured to manage the voltage across load devices A and/or the voltage across load devices B based on a feedback signal 44 (which is used to produce feedback signal 47) coupled to the internal supply voltage VDDA or VDDB and a reference voltage 42 produced based on the reference ground voltage G42, which is coupled to the internal ground VSS, so that the voltage across the load devices A, B can be managed without (or substantially without) influence from the parasitic voltage drops. Specifically, the reference voltage 42, which is produced by the reference voltage circuit 422 and is used for management of the voltage drop across the load devices A, B by the power supply circuit 420, will change (e.g., vary, increase, decrease) with changes (e.g., increases, decreases) in the reference ground voltage G42. Although not shown in FIG. 4, the power supply circuit 420 may not be capable of managing the voltage across the load devices A, B in a desirable fashion if the power supply circuit 420 were configured to manage the voltage across the load devices A, B based on, for example, the output voltage 46 (which is outside of the package of the load module 430) and a reference voltage 42 produced based on the global ground voltage G41 (which is outside of the package of the load module 430 and does not vary) because of the parasitic voltage drops.

As shown in FIG. 4, the feedback signal 47, which is produced based on the feedback signal 44, is combined with the amplified ripple signal 49 to produce an amplified feedback signal 45. The amplified feedback signal 45 is used by the hysteretic comparator 470, with reference to the reference voltage 42, to trigger control of the output voltage 46 by the power supply circuit 420 within a hysteretic voltage range. The hysteretic voltage range (which can be constant or variable and can correspond with an output voltage range) can move with the reference ground voltage G42. Specifically, the reference voltage 42, which is produced based on the reference ground voltage G42 can cause shifting (e.g., upward shifting, downward shifting) of the hysteretic voltage range with respect to the global ground voltage G41 (for desirable voltage control within an output voltage range with respect to the global ground voltage G41). The hysteretic voltage range can shift with changes in the reference ground voltage G42 similar to the changes in the reference ground voltage G2 shown in connection with FIGS. 2A through 2C.

The sensed voltage VDDA or VDDB (as feedback signal 44) is provided to the feedback circuit 464 (which can be, for example, a voltage divider) through path 423. The feedback signal 44 is used by the feedback circuit 464 to produce (e.g., generate) feedback signal 47. In some embodiments, the ripples or the alternating-current (AC) component of the feedback signal 47 may not be large enough (e.g., may not be large enough relative to noise) for hysteretic regulation of the output voltage 46 in a robust or desirable fashion. The ripple feedback circuit 462 can be used to produce the amplified ripple signal 49, which can be used to amplify the ripple or the AC component needed for robust hysteretic regulation. Because of, for example, switches SWA, SWB, which can be relatively high impedance switches (e.g., resistances on the order of thousands of ohms), the ripple or AC component of the feedback signal 44 can be susceptible to dampening and may not be suitable for hysteretic regulation if used alone (not shown). For example, the feedback signal 47, without being added to the amplified ripple signal 49 to produce the amplified feedback signal 45 (this case is not shown), may not be suitable for hysteretic regulation in a desirable fashion. Even if the feedback signal 44 is amplified to produce an amplified ripple signal (not shown) using a block (similar to ripple feedback circuit 462) and added this amplified ripple signal to the feedback signal 47, the combination of this amplified ripple signal and the feedback signal 47 may not be appropriate for robust hysteretic regulation.

Because of the dampening, the signal-to-noise ratio (SNR or S/N) of the feedback signal 44 and the feedback signal 47, which is produced based on feedback signal 44, can be below a desirable level. In other words, a ripple component (AC component) of the feedback signal 44 (and the feedback signal 47), if used by the hysteretic comparator 470 to trigger voltage regulation of the output voltage 46 (and voltage regulation across load devices A, B) by the power supply circuit 420, can be attenuated relative to noise so that the voltage regulation of the power supply circuit 420 may be affected in an undesirable fashion. In some embodiments, the noise can be caused by the load module 430, the power source 450, and/or portions of the power supply circuit 420. In some instances, the noise on the feedback signal 44 (and the feedback signal 47) can cause the hysteretic comparator 470 (if used alone) to erroneously trigger the power stage 426, via the controller circuit 428, to interrupt or provide power from the power source 450.

Figure 5:
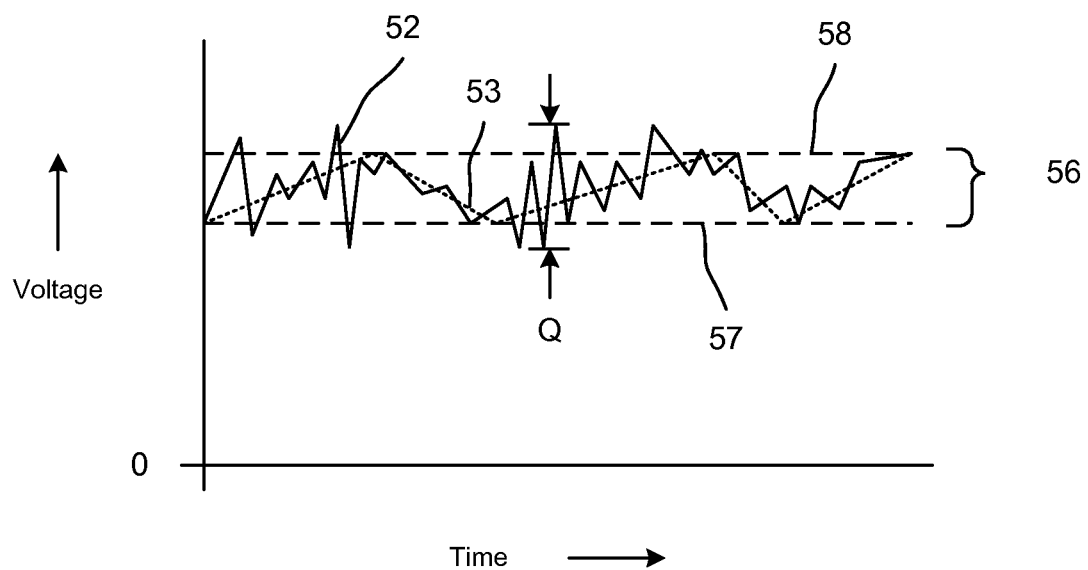
FIG. 5 is a graph that illustrates a feedback signal with a relatively low signal-to-noise ratio.

FIG. 5 is a graph that illustrates a feedback signal 52 with a relatively low signal-to-noise ratio. The feedback signal 52 can be similar to the feedback signal 44 and/or the feedback signal 47 associated with power supply circuit 420 shown in FIG. 4.

As shown in FIG. 5, the voltage of the feedback signal 52 is on the y-axis, and time, which is increasing to the right, is on the x-axis. A ripple component 53 of the feedback signal 52 is illustrated as a dashed line. The ripple component 53 is the portion of the feedback signal 52 that is targeted for use as a feedback signal that can be used for control within a hysteretic voltage range 56. The hysteretic voltage range 56 has an upper threshold 58 and a lower threshold 57. As shown in FIG. 5, the feedback signal 52 has a direct-current (DC) component (e.g., a DC voltage level, an average DC voltage level) approximately within the hysteretic voltage range 56.

In this graph, the ripple component 53 of the feedback signal 52 has been dampened so that the amplitude of noise of the feedback signal 52 is large relative to the amplitude of the ripple component 53. In this embodiment, the ripple component 53 is illustrated as having an amplitude bounded within the hysteretic voltage range 56. As shown in FIG. 5, an amplitude Q of a noisy portion of the feedback signal 52 is larger than the amplitude of the ripple component 53 (and the hysteretic voltage range 56). Accordingly, the portions of the feedback signal 52 outside of the hysteretic voltage range 56 (such as the noisy portions associated with amplitude Q) can trigger the delivery of power or the interruption of power to a load module in an undesirable fashion.

Referring back to FIG. 4, the amplified ripple signal 49 is produced by the ripple feedback circuit 462 based on the output voltage 46 (and not the feedback signal 44). The amplified ripple signal 49 is an amplified version of the ripple component (but not a DC component) that corresponds with the ripple component of the feedback signal 44. In some embodiments, the amplified ripple signal 49 can include at least a portion of a DC component (similar to that in the feedback signal 44). To avoid the damped ripple or AC component due to, for example, high resistance of switches SWA, SWB, the output voltage 46, which has a ripple component that corresponds with (e.g., corresponds temporally with) the feedback signal 44, is used to produce the amplified ripple signal 49 (i.e., the amplified version of the ripple component). The output voltage 46 is used to produce the amplified ripple signal 49, rather than the feedback signal 44, because the feedback signal 44 is affected by (e.g., adversely affected by) dampening. The output voltage 46 is associated with a relatively low impedance path compared with the feedback signal 44, which is associated with the relatively high impedance path due to SWA or SWB, and may not be dampened at all, or to the degree that the feedback signal 44 is dampened, when it is used to generate the amplified ripple signal 49 by ripple feedback circuit 462. The amplified ripple signal 49 (and output voltage 46) has a ripple component that temporally corresponds with (e.g., is aligned from a timing perspective with, is in phase with) a ripple component of the feedback signal 44 (and the feedback signal 47), but is amplified compared with the ripple component of the feedback signal 44 (and the feedback signal 47).

In some embodiments, the ripple feedback circuit 462 can include components (e.g., inductors, capacitors, resistors) configured to filter (e.g., extract) the ripple component (or AC component) associated with the output voltage 46. In other words, the ripple component of the output voltage 46 can be separated from a DC component of the output voltage 46 to produce the filtered ripple component. The filtered ripple component can then be amplified to produce the amplified ripple signal.

The amplified ripple signal 49 is combined at the adder component 466 with the feedback signal 47 (which includes dampened or relatively small ripple component and a DC component) to produce the amplified feedback signal 45. The amplified feedback signal 45 has a signal-to-noise ratio that is higher than a signal-to-noise ratio of, for example, the feedback signal 47 (because of the addition of the amplified ripple signal 49).

Figure 6:
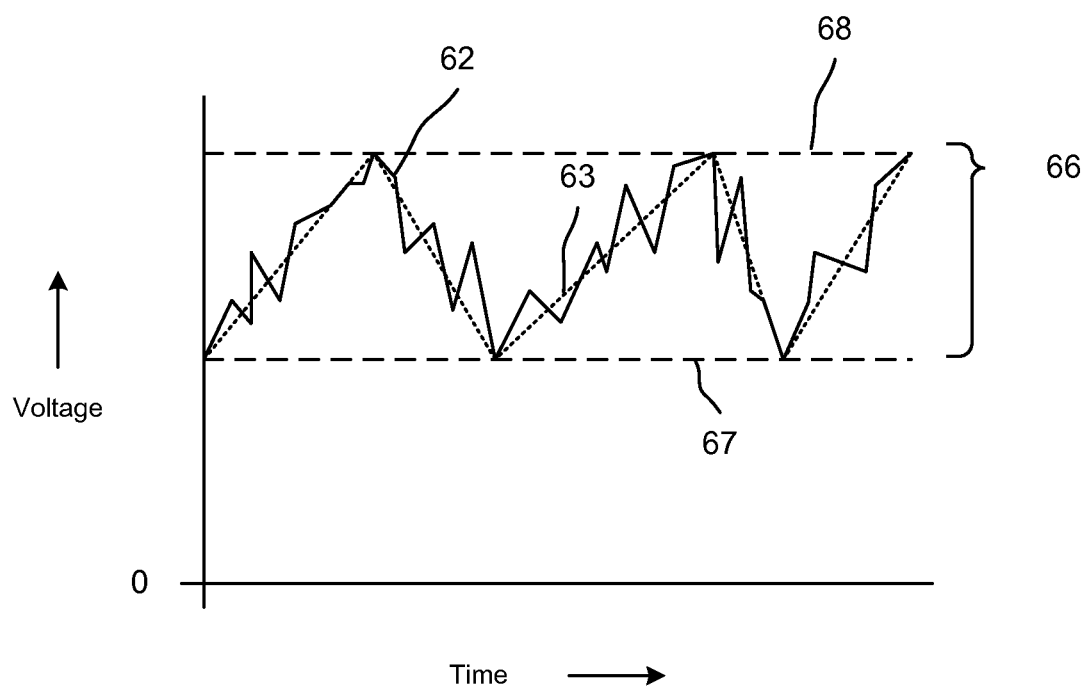
FIG. 6 is a graph that illustrates an amplified feedback signal with a relatively high signal-to-noise ratio.

FIG. 6 is a graph that illustrates an amplified feedback signal 62 with a relatively high signal-to-noise ratio. The amplified feedback signal 62 can be similar to the amplified feedback signal 45 produced by, for example, the power supply circuit 420 shown in FIG. 4.

As shown in FIG. 6, the voltage of the amplified feedback signal 62 is on the y-axis, and time, which is increasing to the right, is on the x-axis. A ripple component 63 of the amplified feedback signal 62 is illustrated as a dashed line. The ripple component 63 is the portion of the amplified feedback signal 62 that is targeted for use as a feedback signal that can be used for control within a hysteretic voltage range 66. The hysteretic voltage range 66 has an upper threshold 68 and a lower threshold 67. As shown in FIG. 6, the amplified feedback signal 62 has a direct-current (DC) component (e.g., a DC voltage level) approximately within the hysteretic voltage range 66.

In this graph, the ripple component 63 of the feedback signal 62 has been amplified (based on a combination of an amplified ripple signal (e.g., amplified ripple signal 49 shown in FIG. 4) and a feedback signal (e.g., feedback signal 47 shown in FIG. 4)) so that the amplitude of noise of the amplified feedback signal 62 is small relative to the amplitude of the ripple component 63. In this embodiment, the ripple component 63 is illustrated as having an amplitude bounded within the hysteretic voltage range 66, which has been defined based on the amplitude of the amplified ripple signal 62. As shown in FIG. 6, because the amplitude of the amplified feedback signal 62, even with the noise, is relatively small compared with the amplitude of the ripple component 63 (and the hysteretic voltage range 66), the noise may not trigger the supplying of power or the interruption of power to a load module by a power supply circuit in an undesirable fashion.

Although not shown in FIG. 6, the hysteretic voltage range (which can be constant or variable) can move with changes in a reference ground voltage (e.g., reference ground voltage G42 shown in FIG. 4). Specifically, a reference voltage, which can be produced based on the reference ground voltage can cause shifting (e.g., upward shifting, downward shifting) of the hysteretic voltage range with respect to a global ground voltage.

Referring back to FIG. 4, the amplified ripple signal 49 can be optionally produced by the ripple feedback circuit 462 based on a combination of the output voltage 46 and a signal (represented by the dashed signal line) associated with a power stage output 48. In some embodiments, the power stage output 48, which can provide a current through the output stage 427 and supplied by the power stage 426, can be in phase with the ripple component of the output voltage 46. In some embodiments, if the output stage 427 includes, for example, a series inductor coupled to a parallel capacitor, the power stage output can provide the current through the series inductor.

In some embodiments, the feedback signal 44 and/or the reference ground voltage G42 can be from sense voltage outputs integrated into the load module 430. For example, if load module 430 is a microprocessor (or other type of circuit), a microprocessor can have sense voltage outputs built into the microprocessor that can be used for the feedback signal 44 and/or the reference ground voltage G42. In some embodiments, internal supply voltages VDDA, VDDB, and/or the internal ground voltage VSS can by physically close to sources, drains, cathodes, anodes, etc. of transistor devices included in the load devices A, B of the load module 430. In some embodiments, the feedback signal 44 and/or the reference ground voltage G42 can be from locations coupled to (or near) the critical devices (e.g., components) across which voltage should be (or are targeted to be) regulated by the power supply circuit 420.

Because the reference ground voltage G42 is coupled to a different location in the load module 430 than the global ground voltage G41, reference ground voltage G42 can be different than the global ground voltage G41. In some embodiments, the reference ground voltage G42 can have a voltage that is higher than a voltage of the global ground voltage G41. In some embodiments, the reference ground voltage G42 can vary with respect to the global ground voltage G41 depending on the load current 40. For example, a relatively high load current 40 can cause relatively high voltage drops across parasitic package resistor RP42 and parasitic board resistor RB42, leading to a corresponding difference between the reference ground voltage G42 and the global ground voltage G41.

Similar to the power supply circuit 120 described in connection with FIG. 1, the reference ground voltage G42 can be different from the internal ground voltage VSS by a voltage drop(s) across a parasitic packaging resistance and/or a parasitic board resistance (and/or other parasitic resistances) along path 421. In other words, a parasitic packaging resistance and/or a parasitic board resistance can be disposed between the reference voltage circuit 422 and the internal ground voltage VSS along path 421. In some embodiments, voltage control inaccuracy caused by parasitic resistance along path 421 is negligible.

In some embodiments, the reference voltage circuit 422 and/or the controller 424 can be calibrated (e.g., adjusted) based on anticipated voltage drops across parasitic resistors along path 421. In some embodiments, the parasitic resistance value can be tailored at the board level such that the voltage drop along path 421 can be cancelled precisely by the build-in offset in the reference voltage for precise voltage control at the load devices A, B.

Similar to the power supply circuit 120 described in connection with FIG. 1, the feedback signal 44 can be different from the internal supply voltages VDDA, VDDB by a voltage drop(s) across a parasitic packaging resistance and/or a parasitic board resistance (and/or other parasitic resistances) along path 423. In other words, a parasitic packaging resistance and/or a parasitic board resistance can be disposed between the controller 424 and the internal supply voltages VDDA, VDDB along path 423. In some embodiments, voltage drops associated with parasitic packaging resistance and/or parasitic board resistance along path 423 are negligible because a current along path 423 to the feedback circuit 464 is quite (e.g., is relatively) small. In some embodiments, the reference voltage circuit 422 and/or the controller 424 can be calibrated (e.g., adjusted) based on anticipated voltage drops related to parasitic resistances along path 423.

In some embodiments, calibration for parasitic resistances (e.g., parasitic board resistances, parasitic packaging resistances) along path 421 and/or along path 423 can be performed (e.g., dynamically performed) based on the power mode of the power supply circuit 420, e.g., pulse width modulation (PWM) mode, pulse frequency modulation (PFM) mode of a buck regulator. In some embodiments, parasitic resistances along path 421 and/or along path 423 can be defined to obtain a desired result within the power supply circuit 420. For example, a parasitic board resistance along path 421 can be configured to balance (at the reference voltage circuit 422 and/or at the controller 424) a parasitic board resistance along path 423 to obtain a precise voltage control at the load device 436. In some embodiments, the current along path 421 and/or path 423 will be within a much smaller range of currents than the load current 40 through the load devices A, B.

Although not shown in FIG. 4, in some embodiments, the reference ground voltage G42 can be produced by a ground voltage circuit (along path 421) based on the internal ground voltage VSS. In some embodiments, the ground voltage circuit can be, for example, a voltage divider or other type of circuit. In such embodiments, the reference ground voltage G42 may not be equal to (or substantially equal to) the internal ground voltage VSS.

In some embodiments, the power supply circuit 420 can be, or can include, for example, any type of switch regulator that includes a switch circuit within the power stage 426. In some embodiments, power supply circuit 420 can be referred to as a switched-mode power supply (SMPS). For example, power supply circuit 420 can be, or can include, a buck regulator, a boost regulator, a buck boost regulator, and/or so forth. In some embodiments, the power supply circuit 420 can be, or can include, any combination of DC-to-DC (e.g., a buck-boost converter) or alternating current (AC)-to-DC converters.

Although not shown, an input stage, an output stage (or additional output stages such as output stage 427), and/or so forth, may be operably coupled to, or included in the power stage 426 and/or the controller 424 shown in FIG. 4. For example, the output stage 427 can include various types of circuitry for the power stage 426 including, for example, one or more capacitors, inductors, transformers, transistors, resistors, feedback circuits, and/or so forth.

Although not shown, in some embodiments, the controller 424 can include one or more comparators (e.g., in addition to the hysteretic comparator 470), amplifiers, an input stage, any type of control circuitry configured to produce a control signal that can trigger switching of a switch circuit within the power stage 426, and/or so forth. For example, the control circuit of the power stage 426 can include a signal generator configured to produce a control signal that has a square-wave waveform (e.g., a square-wave waveform with rising and falling edges).

In some embodiments, the power source 450 can be any kind of power source. For example, the power source 450 can be a direct current (DC) power source such as a battery, a fuel cell, and/or so forth. Although not shown in FIG. 4, additional portions of the power supply circuit 420 (in addition to the power stage 426) may be powered by the power source 450. For example, the reference voltage circuit 422, controller 424, and/or so forth, may be coupled to and/or powered by the power source 450.

Figure 7:
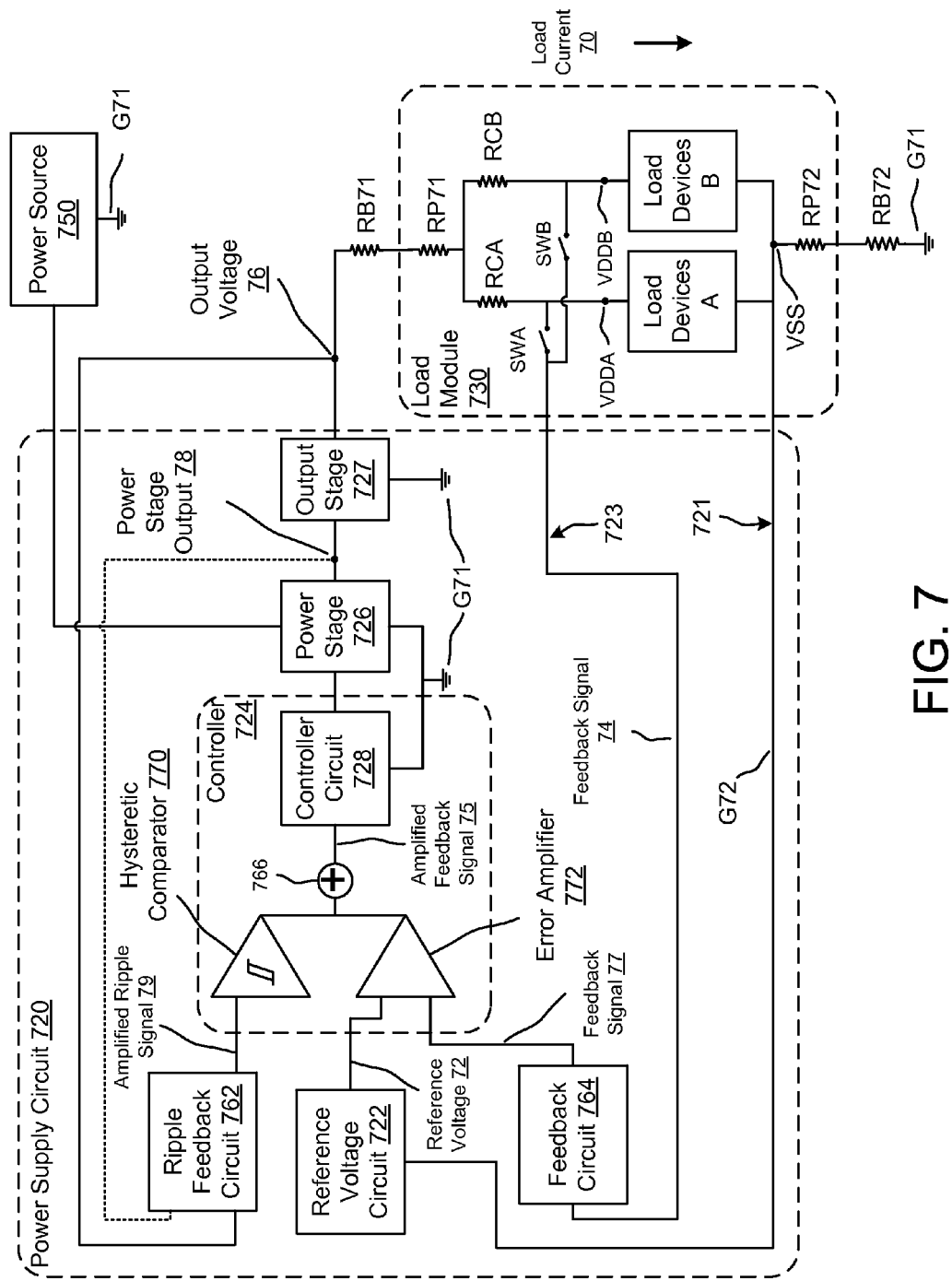
FIG. 7 is a diagram that illustrates yet another power supply circuit configured to deliver power from a power source to a load module.

FIG. 7 is a diagram that illustrates yet another power supply circuit 720 configured to deliver power from a power source 750 to a load module 730 (also can be referred to as a working device). The power supply circuit 720 includes a reference voltage circuit 722 (e.g., a bandgap reference circuit), a controller 724, a power stage 726, and an output stage 727. The power supply circuit 720 is configured to manage (e.g., control, regulate) an output voltage 76 that is delivered to the load module 730 based on a reference voltage 72, a feedback signal 77, and an amplified ripple signal 79. As shown in FIG. 7, the feedback signal 77 and the amplified ripple signal 79 are combined (e.g., combined at an adder component 766) to produce an amplified feedback signal 75. The signals can each be defined by one or more voltages that can change over time. In some embodiments, the amplified ripple signal 79 (or component signals used to the produce the amplified ripple signal 79) can function as, or can be referred to as, an alternating current (AC) feedback signal, and the feedback signal 77 (or component signals used to the produce the feedback signal 77) can functions as, or can be referred to as, a direct current (DC) feedback signal. As shown in FIG. 7, the AC feedback signal(s) and the DC feedback signal(s) are associated with different locations of the load module 730.

The power supply circuit 720 shown in FIG. 7 is identical to the power supply circuit 420 shown in FIG. 4 except for the configuration of the controller 724. The controller 724 shown in FIG. 7 includes a hysteretic comparator 770 and an error amplifier 772. The output of the hysteretic comparator 770, which receives the amplified ripple signal 79, is combined (at the adder component 766) with the output of the error amplifier 772, which receives the feedback signal 77 and the reference voltage 72, to produce the amplified feedback signal 75. The output of the error amplifier 772 can move (e.g., shift in an upward direction, shift in a downward direction) with movement in the reference ground voltage G72. In some embodiments, the reference ground voltage G72 can be directly received by the reference voltage circuit 722 without intervening circuitry (e.g., operational amplifiers, sense circuitry, etc.) and/or processing. In some embodiments, different configurations of the power supply circuit shown in FIG. 1, 4, or 7 (e.g., the controller 724 of the power supply circuit 720) can be implemented.

Implementations of the various techniques described herein may be implemented in digital electronic circuitry, or in computer hardware, firmware, software, or in combinations of them. Portions of methods may be performed by, and an apparatus (e.g., the input power protection device, the power management device) may be implemented within, special purpose logic circuitry, e.g., an FPGA (field programmable gate array) or an ASIC (application-specific integrated circuit).

Some implementations may include various semiconductor processing and/or packaging techniques. Some embodiments may be implemented using various types of semiconductor processing techniques associated with semiconductor substrates including, but not limited to, for example, Silicon (Si), Galium Arsenide (GaAs), Silicon Carbide (SiC), and/or so forth.

While certain features of the described implementations have been illustrated as described herein, many modifications, substitutions, changes and equivalents will now occur to those skilled in the art. It is, therefore, to be understood that appended claims, when included, are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a power stage configured to be coupled to a power source and a controller;
a reference voltage circuit coupled to the controller and configured to be grounded to a first ground voltage different from a second ground voltage associated with a load module; and
the controller configured to trigger the power stage to deliver an output voltage to the load module based on a combination of a first feedback signal produced based on the output voltage and a second feedback signal produced based on a voltage between the output voltage and the first ground voltage.

2. The apparatus of claim 1, wherein the first feedback signal is an amplified ripple signal.

3. The apparatus of claim 1, wherein the first feedback signal includes an alternating current (AC) component.

4. The apparatus of claim 1, wherein the second feedback signal has a ripple component that temporally corresponds with and is attenuated compared with a ripple component of the first feedback signal.

5. The apparatus of claim 1, wherein the second feedback signal is coupled to a plurality of load devices of the load module via a switch.

6. The apparatus of claim 1, further comprising:
a hysteretic comparator included in the controller, the hysteretic comparator configured to trigger the power stage to at least one of deliver power or interrupt power to the load module based on a hysteretic voltage range.

7. The apparatus of claim 1, wherein the first ground voltage is from a portion of the load module inside of a package of the load module, and the second ground voltage is a ground voltage outside of the package of the load module.

8. The apparatus of claim 1, wherein the first ground voltage is different from the second ground voltage by a voltage drop across a portion of a package of the load module.

9. The apparatus of claim 1, wherein the first ground voltage is configured to vary with respect to a second ground voltage in response to change in a current through the load module.

10. The apparatus of claim 1, wherein a difference between the first ground voltage higher and the second ground voltage changes in response to a load current through the load module changing.

11. The apparatus of claim 1, wherein the second ground voltage is a global ground voltage and the first ground voltage is a local ground voltage for the reference voltage circuit.

12. The apparatus of claim 1, wherein the power supply circuit is a direct-current (DC) voltage converter.

13. An apparatus, comprising:
a controller including a hysteretic comparator;
a power stage coupled to the controller and configured to be coupled to a power source, the power stage configured to deliver an output voltage to a load module in response to the controller; and
a reference voltage circuit coupled to the controller and configured to be grounded to a first ground voltage different from a second ground voltage associated with the load module.

14. The apparatus of claim 13, wherein the hysteretic comparator included in the controller is configured to produce an amplified feedback signal, the power stage is configured to deliver the output voltage based on the amplified feedback signal produced by the hysteretic comparator.

15. The apparatus of claim 13, wherein the first ground voltage is from a portion of the load module inside of a package of the load module, and the second ground voltage is a ground voltage outside of the package of the load module.

16. The apparatus of claim 13, wherein the first ground voltage is different from the second ground voltage by a voltage drop across a portion of a package of the load module.

17. The apparatus of claim 13, wherein the first ground voltage is configured to vary with respect to a second ground voltage in response to a change in a current through the load module.

18. The apparatus of claim 13, wherein the reference voltage circuit is configured to produce a reference voltage,
the controller is configured to control the output voltage provided via the power stage based on the reference voltage produced by the reference voltage circuit and based on a feedback signal that has a voltage higher than the first ground voltage, the feedback signal being coupled to a plurality of switches included in the load module.

19. The apparatus of claim 13, wherein a difference between the first ground voltage and the second ground voltage changes in response to a load current through the load module changing.

20. A power supply circuit, comprising:
a power stage configured to be coupled to a load module and configured to be coupled to a first ground voltage;
a reference voltage circuit configured to be coupled to a second ground voltage varying with respect to a first ground voltage in response to a current through the load module, the reference voltage circuit configured to produce a reference voltage based on the second ground voltage; and
a controller coupled to the power stage and coupled to the reference voltage circuit, the controller configured to trigger the power stage to deliver an output voltage to the load module based on a combination of a feedback signal from a power side of a plurality of load devices included in the load module, the reference voltage, and a ripple signal.

21. The power supply circuit of claim 20, wherein the ripple signal is an amplified ripple signal,
the power supply circuit further comprising:
an output stage coupled to the power stage; and
a ripple feedback circuit configured to produce the amplified ripple signal based on the output voltage and based on a voltage between the output stage and the power stage.

22. The power supply circuit of claim 20, wherein the reference voltage is calibrated based on a board resistance associated with the second ground voltage.

23. The power supply circuit of claim 20, wherein the power supply circuit is a direct-current (DC) voltage converter.

24. The power supply circuit of claim 20, wherein the first ground voltage is different from the second ground voltage by at least a voltage drop across a portion of a package of the load module.

25. A method, comprising:
receiving a first voltage from a first location internal to a package of a load module, the first voltage being different from a ground voltage for the load module;
receiving a second voltage from a second location internal to the package of the load module, the second voltage being different from the ground voltage for the load module;
producing a reference voltage based on the first voltage;
producing a ripple signal based on a feedback signal associated with an output voltage for the load module; and
producing the output voltage for the load module based on the reference voltage, the ripple signal, and the second voltage.

26. The method of claim 25, wherein the ripple signal functions as an alternating current (AC) feedback signal, the second voltage functions as a direct current (DC) feedback signal.

27. The method of claim 25, wherein the reference voltage is produced using a reference voltage circuit, the first voltage functions as a ground voltage for the reference voltage circuit.

28. The method of claim 25, wherein the first voltage functions as a ground voltage for a reference voltage circuit, the method further comprising:
increasing the reference voltage with respect to the ground voltage for the load module in response to an increased current through the load module, the ground voltage for the reference voltage circuit being higher than the ground voltage for the load module.

29. The method of claim 25, wherein a difference between the first voltage and the second voltage is smaller than a difference between the output voltage and the ground voltage.

* * * * *